Dec. 19, 1967   R. P. GRAHAM ET AL   3,358,723
PROCESS FOR PEELING WHEAT AND OTHER GRAINS
Filed Jan. 12, 1966
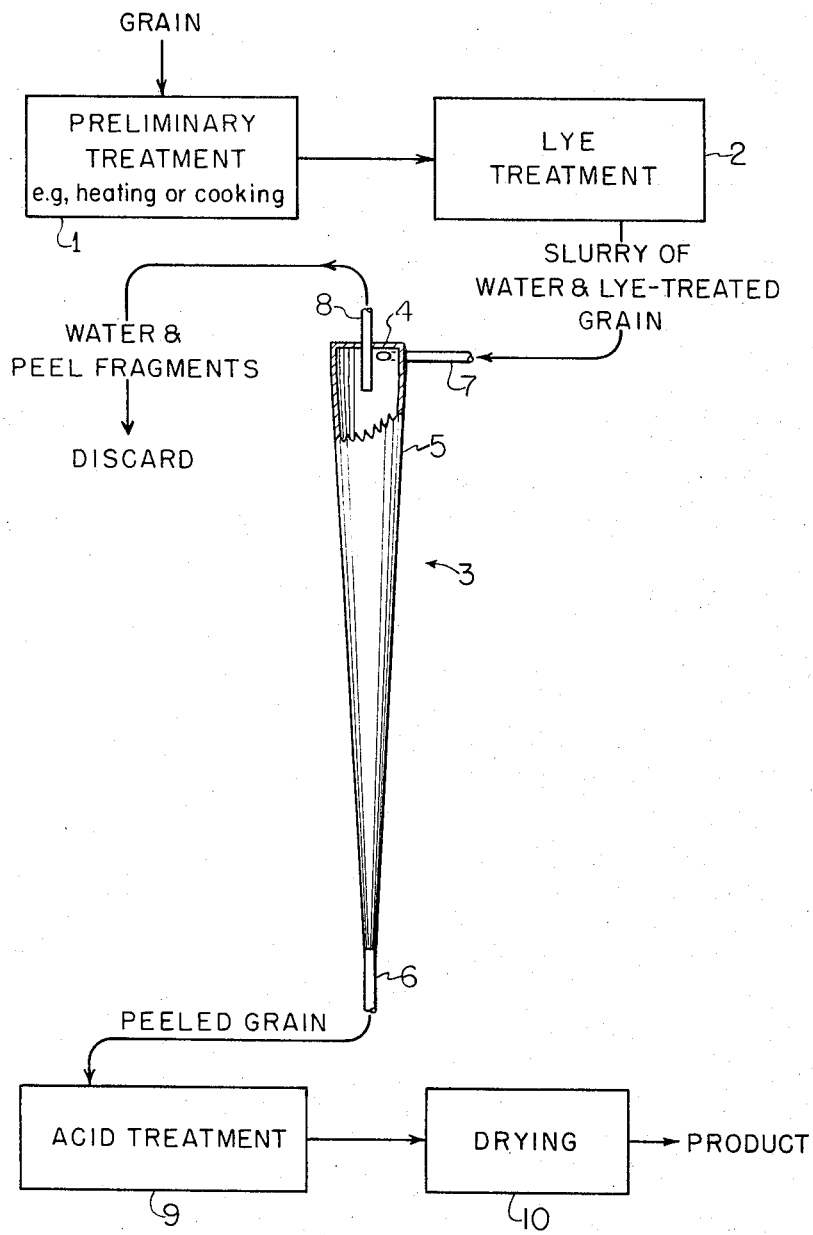
R.P. GRAHAM, E.J. BARTA,
A.I. MORGAN, JR.
INVENTORS
BY R. Hoffman
W. Bier
ATTORNEYS

United States Patent Office 3,358,723
Patented Dec. 19, 1967

3,358,723
PROCESS FOR PEELING WHEAT AND
OTHER GRAINS
Robert P. Graham, El Cerrito, Edward J. Barta, Albany, and Arthur I. Morgan, Jr., Berkeley, Calif., assignors to the United States of America as represented by the Secretary of Agriculture
Filed Jan. 12, 1966, Ser. No. 520,273
4 Claims. (Cl. 146—225)

ABSTRACT OF THE DISCLOSURE

Peeled grain products are produced by applying the following steps:

(1) Raw wheat, or other grain, is subjected to any of several pretreatment steps—heating, soaking, cooking, or treatment with aqueous acid, e.g., acetic acid. A preferred pretreatment involves soaking the wheat in hot water for an hour, tempering (holding) the soaked wheat at 180° F. for 30 minutes, and cooking it with steam (212° F.) for 12 minutes.

(2) The grain, in its original state or previously subjected to any of the pretreatments, is contacted with aqueous sodium hydroxide (15–25%) at 150–180° F. until the peel is loosened.

(3) The lye-treated grain is slurried in water and the slurry is pumped into a conical zone wherein the slurry is directed in a spiral path of decreasing radius of curvature and increasing angular velocity to detach the loosened peel from the grains and to separate the peeled grains from the remainder of the slurry.

(4) The peeled grains are preferably treated with dilute acid (acetic) to bleach them, and they are then dried.

---

A non-exclusive, irrevocable, royalty-free license in the invention herein described, throughout the world for all purposes of the United States Government, with the power to grant sublicenses for such purposes, is hereby granted to the Government of the United States of America.

This invention relates, in general, to the processing of grains and has as its primary objects the provision of novel processes for preparing peeled wheat products and other peeled grain products. Further objects and advantages of the invention will be evident from the following description wherein parts and percentages are by weight unless otherwise specified.

The annexed drawing is a diagram illustrating the flow of materials through the processing system.

It is well known that there exists a large surplus of wheat in the United States, whereas there are food shortages in many parts of the world, particularly in India and the Far East. It might be expected that surplus wheat could be exported to relieve these food shortages. A significant obstacle is, however, that people in the areas in question are not familiar with wheat, nor its culinary uses. Ordinarily, wheat is converted into flour which is then used in the preparation of bread or related bakery products. Although the use of bread as a staple food has an ancient tradition in Europe and countries having a European background, it is little known in the Far East; people in this region, although short on food, are accustomed to a diet of rice and have little interest in bread. As a consequence, a successful program requires conversion of wheat into a product which is adapted for consumption in the form of the grains, as is the case with rice. A particular object of this invention is the provision of processes whereby wheat can be readily converted into products which resemble rice and which have culinary uses similar to those of rice.

The conversion of wheat into products which resemble rice is particularly difficult because of the nature of the bran which surrounds the wheat endosperm. Thus, in wheat the bran exists as a series of six distinct superposed layers over the endosperm. This laminated effect makes the bran as a whole very tough and very resistant to removal. In rice, on the other hand, the bran has no distinct layers but is a structure of fibers in an unorganized, felted arrangement. As a result, the bran of rice is not as tough as wheat bran and is relatively easy to remove from the endosperm. In conventional practice, rice is subjected to milling operations, involving exposing the rice to mechanical rubbing or abrasion, whereby the bran is removed easily and efficiently, that is, with relatively little breakage of kernels or loss of endosperm material. On the other hand, when milling operations are applied to wheat, one attains inadequate bran removal if the milling conditions are mild and excessive losses if the milling conditions are severe. Thus, if the conditions of milling are adjusted to be mild, bran tends to be removed mainly from the germ end and the beard end of the wheat grains but little if any bran is removed from the sides (the equatorial portion, considering the germ and beard ends as the poles). On the other hand, if the conditions of milling are adjusted to get a greater degree of abrasive force, the wheat kernels are broken and a considerable percentage of the endosperm material is ground into fine particles. Such results are useful—and indeed desirable in conventional flour manufacture—but are of no avail for the problem at hand.

In the copending application of Edward J. Barta, Paul W. Kilpatrick, and Arthur I. Morgan, Jr., Ser. No. 336,603, filed Jan. 8, 1964, now Patent No. 3,264,113 there is disclosed a process for treating wheat to provide de-branned kernels which can be consumed like rice. Basically, the process involves these steps: The wheat is first subjected to heating or cooking, using hot water or steam. The wheat, while still hot, is contacted with hot aqueous NaOH to loosen the bran. The lye-treated wheat is then slurried with water and pumped through a constriction providing a zone of turbulence whereby the loosened bran is stripped from the kernels. The de-branned kernels are then separated from water and bran by a flotation step. Although the above-described process provides excellent results, it is not well adapted for continuous operation. Thus, in extended operation, plugging of the constriction may occur. This is of little consequence in batch operations but in continuous operation where each step is in series with each other, the interruption occasioned by plugging will tie up the whole production line while the line is cleared. Another disadvantage of the prior method is that the step of pumping the slurry through a constriction gives a low throughput of material. For operating on a production basis, several units must be operated simultaneously. This, in turn, involves a considerable expense in equipment, particularly pumps, and uses an excessive amount of power relative to the yield of product. A further disadvantage of the prior method is that after the peel has been detached from the kernels, a flotation step is required to separate the peeled kernels from the remainder of the material (water and detached peel). This step requires the use of bulky apparatus to effectuate the gravity separation.

It is, therefore, a principal object of the invention to provide a grain-peeling process which is particularly adapted for continuous operation and wherein detachment of the loosened peel from the kernels and separation of the peeled kernels from the remainder of the material under treatment are accomplished effectively and efficiently.

In a practice of the invention, the grain is subjected to the preliminary and lye-treating steps as in the aforesaid prior technique. At this point there is achieved a loosening of the peel (bran, in the case of wheat), but not a removal thereof from the kernels. Accordingly, the lye-treated grain is slurried with water and this slurry is subjected to the special treatment which forms the basis of this invention. In accordance with the invention, therefore, this slurry is pumped through a hydrocyclone 3. This is a device having a housing formed with a top cover 4 and a conical side wall 5 tapering downwardly to a discharge pipe 6. The slurry is pumped into the top of the device through an inlet 7 arranged tangential to the side wall. An upper outlet pipe 8 is also provided, which extends through the cover 4 into the upper part of the conical space. As the slurry moves through the hydrocyclone, the loosened peel is detached from the kernels and the peeled kernels are separated from the remainder of the slurry, this remainder being mainly water and detached peel. The kernels because of their greater density are discharged through the bottom discharge outlet 6; the stream of water and detached peel leaves the hydrocyclone via the upper outlet pipe 8. In sum then, the passage through the hydrocyclone yields the desired result of removal of loosened peel from the kernels and concomitant separation of the peeled kernels from the remainder of the material. The resulting peeled kernels may then be washed to remove any traces of lye, treated with acid and dried, all as disclosed in said prior application.

The effective action attained in the hydrocyclone may be explained as follows: The tangential inlet and conical side walls of the device direct the entering stream in a curved path. At first this path will occupy the full radius of the device at the level of entry but later the succeeding portions of material will force this path inwardly. The net result then is that the material flows in a spiral pattern with decreasing radius of curvature, hence increasing angular velocity (in accordance with the law of conservation of angular momentum). Of course, the initial velocity is high because the slurry is forced under superatmospheric pressure through the device and succeeding velocities reach extremely high levels. This whirling effect at increasing speed causes detachment of loosened peel by a centrifugal action since accelerations hundreds of times that of gravity are generated. Another item is that the kernels—because of their dimensions and high density—are subject to an inertial effect whereby they are deterred from moving as fast as adjacent streams of water. The resulting high-velocity movement of water past the kernels materially assists in stripping off the peel. Also, since the angular velocity of the material in the hydrocyclone varies in accordance with the distance from the outer wall, kernels which overlap zones of different angular velocity are subjected to a tumbling and rubbing action which aids in detaching bran. As the whirling action continues, the peeled kernels are spun out of the aqueous stream and are propelled downwardly through the bottom discharge pipe. The remainder of the stream—water carrying suspended peel, now in the form of small fragments—is discharged through the upper outlet pipe.

The system used in accordance with the invention not only provides effective removal of peel and separation of the peeled grain but also does this efficiently and with apparatus of small size. In typical installations, it has been found that a hydrocyclone having a 3-inch diameter (at the top) and a length of 24″ will handle 400 lbs. per hour of wheat. Moreover, with the system of the invention, no plugging problems are encountered and the line may be conducted continuously without interruption.

An important advantage of the process of the invention is that uniform peel removal is achieved without damage to the kernels. Thus, the kernels are not broken but remain whole and little if any endospermic material is abraded off the grains. Another advantage is that in treating wheat the aleurone layer about the endosperm is retained. The significance of this item is explained as follows: The wheat grain or berry, after threshing to remove the husk, consists of a starchy endosperm, to which is attached the germ, and a bran envelope surrounding the endosperm and germ. This bran envelope consists of a series of six distinct superposed layers or coats. Of particular interest are the innermost, relatively thick layer termed the aleurone and the thin layer above the aleurone termed the seed coat or testa. As noted above, in the practice of this invention the innermost (aleurone) bran layer is retained. In this connection, it is to be realized that the aleurone layer is relatively thick and its removal would entail a considerable drop in yield of product. Moreover, the aleurone layer does not exert any disadvantageous effect on the product and, in fact, it offers advantages. Of interest in this connection are the facts that the aleurone layer is not deeply pigmented; it contains substantial proportions of vitamins, particularly those of the B group; it is relatively permeable to water (thus products retaining this layer can imbibe water readily when prepared for consumption); it acts to minimize cohesion between individual grains when the products are prepared for the table and to prevent disintegration of grains during cooking. In the process of the invention, the testa is removed. This is particularly advantageous because this layer, although it is quite thin, is highly pigmented and is relatively impervious to the penetration of water. Another significant aspect of the invention is that the germ is largely removed from the wheat kernels. This has the benefit that the products keep well—they do not develop rancid odor or taste even when stored for long periods, even at elevated temperatures. On the other hand, products which retain the germ are very susceptible to developing rancidity (because of the unsaturated fats in the germ), particularly when stored at elevated temperatures such as commonly encountered in Asiatic countries.

The practice of the invention is described below in more detail, having reference to the drawing. As noted above, various steps in the overall process—including the initial treatment, lye treatment, acid treatment, drying, etc.—are described in the prior application and form no part of the present invention but are included to provide a complete setting in which to practice the present invention.

*Block 1.*—The raw grain may be fed directly to the lye treatment but, preferably, it is subjected to any one of several pretreatment steps. These steps may involve such alternative processes as heating, soaking, cooking, or treatment with acid. Since the lye treatment is conducted at an elevated temperature, it is advantageous that the grain be hot (about 150–180° F.) when it is mixed with the lye. Under such conditions, the total time for the lye treatment is reduced and the possibility of such undesirable effects as nonuniform bran loosening, distortion or rupture of kernels, or degradation of vitamins or other valuable nutrients by the lye is minimized. Consequently, the preferred modifications of the invention include a step wherein the grain is heated—as by contact with steam or hot water—prior to contact wtih the lye. The heating may be conducted under such conditions as to primarily raise the temperature of the grain or to actually cook it, that is, gelatinize the starch in the endosperm. Another advantage of such preliminary heating or cooking is that the end product will exhibit a shorter cooking time. Thus the preliminary treatment can be varied—for example, as to temperature and time—to effect a greater or lesser reduction in cooking time of the end product, as may be desired. A further advantage is that such preliminary treatment is believed to cause a diffusion of vitamins, particularly water-soluble vitamins, such as thiamine, from the bran layers on the germ into the endosperm. In another alternative form of the pretreatment, the heating is carried out in water acidified to a pH of about 2 to 5.5, whereby an especially desirable degree of diffusion of vitamins into the endosperm is attained. Typical ways in which the pretreatment may be effectuated are disclosed in detail below.

*Preliminary treatment (heating).*—In a preferred embodiment of the invention, the heating is accomplished by contact with steam. As an example, the grain is passed through a conventional food blancher wherein it is contacted with steam (at 212° F.) issuing from nozzles. The throughput of grain, amount of steam, and time of residence in the blancher are correlated so that the grain is brought up to about 180° F. The grain, while still hot, is then transferred to the lye treatment. In another modification of the invention the heating is accomplished in hot water. As an example, the wheat is fed into a trough, U-shaped in cross-section, provided with a screw, and filled with hot water. Heating jackets are provided to maintain the water at the exit end of the trough at about 180° F.; generally, the water at the feed end is kept at a lower temperature, for example, about 135° F., thus to provide a progressive heating of the grain. Such progressive heating is especially desirable to avoid rupture or distortion of the kernels. It is evident that as the grain is moved through the trough it is brought up to a temperature of about 180° F. Following the treatment with hot water, the grain is preferably tempered, that is, it is held or aged so that the moisture in the grains can equilibrate. Such equilibration is desirable as it prevents rupture or distortion of the grains in subsequent processing. Generally, the tempering is accomplished by holding the grain while hot, i.e., at about 165–185° F., for a period of about 10 to 30 minutes. The grain which has thus been heated in water, with or without the tempering treatment, is transferred while hot to the lye treatment.

*Preliminary treatment (cooking).*—In another modification of the pretreatment, the grain—after heating in hot water and tempering as described above—is cooked. The point of this cooking is to provide a precooked end product which can be prepared for the table in an especially short time. The cooking step is carried out by contacting the grain, still hot from the tempering, with steam at atmospheric pressure. As an example, the grain may be cooked in a conventional food blancher which includes an endless perforated belt for transporting the wheat through a housing wherein it is exposed to contact with steam (at 212° F.). The perforated belt also has the important function of providing continuous draining of the grain during the steam treatment, whereby rupture of the kernels is prevented. Generally, the conditions of operation, such as the throughput of grain, amount of steam, time of residence in the system, etc. are correlated so that the grain is cooked; that is, the starch in the kernels is gelatinized. This will usually involve subjecting the grain to the steam at atmospheric pressure for a period of 15 to 20 minutes. The cooked grain, while still hot, is then transferred to the lye treatment.

*Preliminary treatment (with acid).*—In this modification of the pretreatment the raw grain is contacted with an aqueous solution of a nontoxic acid such as sulphuric, phosphoric, citric, acetic, etc. The acid is used in an amount to provide a solution with a pH of about 2 to 5. Generally, acetic acid is preferred and is used in a concentration of about 1%. The acid solution may also contain an acidic buffer, for example, sodium acetate. Preferably, the acid is applied in conjunction with any of the heating or cooking steps previously described to attain concomitant acid treatment and heating (or cooking). Typical ways of carrying out these treatments are given below. The grain is mixed with at least sufficient acid solution to coat the surfaces of the kernels and then the grain is contacted with steam to bring its temperature up to about 180° F. Another plan is to immerse the grain in an excess of the acid solution and heat the solution to about 180° F. Typically, the heating procedure in hot water, described in detail above, may be applied but substituting the acid solution for the water. Tempering may be applied to the acid-treated hot grain, as with the other heating procedures explained above, to equilibrate moisture content and relieve internal stresses in the kernels. Also, cooking in steam, as described above, may be applied to any of the products of the acid treatment if the aim is to attain an end product of especially short cooking time.

The advantage of the acid treatment, particularly in conjunction with heating or cooking, is that it is believed to enhance the diffusion of vitamins from the exterior portions of the kernels into the endosperm.

*Block 2.*—In this step the grain—in its original state or previously subjected to any of the preliminary treatments set forth above—is contacted with aqueous sodium hydroxide at an elevated temperature, i.e., about 150–180° F. The concentration of NaOH in the solution is generally 15 to 25%, preferably 20%, and the solution is applied in an amount sufficient to coat or wet the surfaces of the kernels. This amount will generally be on the order of 10 to 20 parts of solution per 100 parts of grain. To avoid any cooling effect, the lye solution is applied hot, that is, at about 150–180° F. During the course of the treatment it is preferred to apply mixing to spread the lye solution uniformly over the grains, thus to promote uniform loosening of the peel. During the mixing the system may be heated by conventional steam coils or by direct addition of steam. The lye solution is allowed to act until the peel slips readily off the grains. In any particular case this can be readily determined by removing a sample of the wheat, rinsing it in water, and testing the adherence of the peel with the fingers. When the peel slips readily off the kernels in long shreds, the process is terminated. In general, the action of the sodium hydroxide is complete in about 2 to 10 minutes. In cases where the lye solution contains 20% NaOH and the procedure is carried out at 180° F., the peel-loosening is completed in about 3 minutes. When the peel has been loosened, the action of the lye is terminated or short-stopped by a quenching step, i.e., mixing the hot, lye-treated wheat with an excess of cold water. Detached peel, soluble materials produced by the lye action, etc. may then be removed by washing the grain while supported on a perforated surface, for example, a shaker screen, with a spray of cold water. In the alternative, the slurry of water and lye-treated grain produced in the quenching step may be directly applied to the de-branning step.

In the foregoing description, we have stressed application of our novel process to wheat. However, the invention is by no means limited to this particular commodity and may be applied to grains of all kinds, typically, barley, oats, rye, sesame, milo, soybeans, rough rice (paddy), brown rice, etc. The light-colored, peeled kernels produced in accordance with the invention are eminently suitable for use as quick-cooking cereals, as snack foods, as breakfast cereals, as ingredients for soups and baby foods, and as raw materials for the production of high-protein, low-fiber flours. The various steps described herein in connection with wheat are equally applicable to other grains. It may be observed that the type of peel will vary with different grains. Some, like wheat, have only a bran covering. Typical in this area are rye, sesame, milo, and brown rice. Others—for example, barley, oats, and rough rice—have a hull over the bran layer. The peeling which is obtained in applying the process of the invention is bran removal where the grain has only a bran covering, and removal of both hull and bran in cases where the grain has both of these. In treating grains other than wheat, one item which may require adjustment is the concentration of NaOH in the lye treatment step. Some grains will require a higher concentration to achieve effective peeling. For example, oats and barley have a tough fibrous coating—the hull—which must be removed with the underlying bran. Thus for these grains, it is preferred to use a NaOH concentration of about 25% to ensure effective peeling. Soybeans also have a peel which requires a high concentration (25%) of NaOH. With other grains—for example, brown rice and sesame—the NaOH concentration may be as low as 1 to 5% to achieve satisfactory peeling.

*Detachment of peel and separation of peeled kernels.*— After the lye treatment the peel is in a loosened state but still on the kernels. Accordingly, the slurry of water and lye-treated grain is pumped into hydrocyclone 3 as explained above. The stream of water and peel fragments flowing from outlet 8 is discarded (or treated to recover the peel); the peeled grain discharged from outlet 6 is transferred to the next step, directly, or after a water-wash, if necessary, to remove traces of lye.

Block 9.—The product at this point generally has a pale yellow-green color and it is desirable to correct this color deficiency. We have found that a treatment of the grain with dilute acid bleaches this coloration, producing an essentially white product. Although any nontoxic acid can be used in this treatment such as sulphuric, citric, phosphoric, etc., we prefer to use acetic acid. It has the advantage of volatility so that any excess left in or on the wheat is removed in the subsequent drying operation. The acid is used in dilute concentration—about 0.5 to 5%—and the grain is kept immersed in an excess of the acid solution long enough for the desired bleaching to take place. Preferably, the acid solution is warmed, for example, to a temperature of 100 to 150° F., to hasten the bleaching action. Generally, using a 1% solution of acetic acid at a temperature of 120–130° F., the desired color is attained with an immersion time of about 10 minutes. Following the acid treatment, the grain is washed with water and is forwarded to the drying step.

Block 10.—In this final step of the process the peeled grain is dried. This can be accomplished with any of the conventional driers used with grain products. For example, a tray drier can be used where the grain spread on screens is exposed to a cross-flow or through-flow of air at about 150–160° F. Another example is the use of a column-type drier wherein the grain cascades over a baffle arrangement while exposed to an upward current of hot air. If desired, the drying may be conducted in stages, that is, a portion of the moisture content is removed in one stage, the material allowed to stand to permit equilibration of moisture and further drying and equilibration are repeated as necessary. Such step-wise drying is generally preferable as avoiding internal strains and thus prevents any rupture of individual kernels. In any event, the drying is continued until the product contains about 10% moisture.

In typical operations, the resulting product made from wheat resembles rice in appearance and cooking quality. It consists of unbroken kernels of wheat with the bran essentially completely removed (except for the desired innermost aleurone layer), essentially white in color, and with about 20% to 100% of the germ removed, depending on the extent of the pretreatment applied. It is evident that where more severe conditions are applied in the pretreatment, a greater proportion of germ will be removed. To prepare the product for the table, it is added to water and cooked for about 15 to 30 minutes. Because the wheat berry characteristically has a longitudinal crease within which the bran is infolded, the products retain this "crease" bran. This is particularly the case with those products wherein no preliminary treatment is used or where the preliminary treatment does not involve an actual cooking of the kernels. This portion of the bran is, however, an insignificant part of the total bran and offers no problem in cooking or eating. Moreover, in the modification of the invention wherein the preliminary treatment involves a cooking operation, this portion of the bran is absent, as well as the rest. Thus, in this product the crease is opened somewhat and the "crease" bran removed. Also, the products of this modification have a somewhat translucent appearance, whereas those prepared without a cooking step are essoentially opaque.

Generally, the drying step—as explained above—is conducted by contacting the wet debranned kernels with air at a temperature on the order of 150–160° F., thus to attain dehydration without affecting the size of the kernels. If desired, however, the drying can be conducted under conditions to attain concomitant drying and expansion of the individual kernels. Such results can be achieved, for example, by applying air at higher temperatures, for example, up to 350° or 400° F., and at high-flow velocities. Under such conditions, internal pressures of steam are created within the kernels which expand the kernels, i.e., increase their volume. By suitable choice of conditions, one may obtain a limited expansion, for example, a volume of 1.5 to 2.5 times that of the original kernals or a greater expansion to produce a very low density, puffed product.

The invention is further demonstrated by the following illustrative examples:

EXAMPLE I

A pre-cooked, peeled wheat product was prepared on a continuous basis in the following manner:

(a) *Soaking.*—Raw wheat was fed at the rate of 250 lbs./min. into a trough, U-shaped in cross-section, provided with a screw, and filled with hot water. Heating jackets were provided to maintain the mixture at 135° F. at the feed end, 180° F. at the exit end. The time of sojourn of the wheat in the trough was one hour.

(b) *Tempering.*—The soaked wheat was fed through a bin wherein it was held at 180° F. Sojourn time was 30 minutes.

(c) *Cooking.*—The soaked and tempered wheat was passed through a reel wherein it was contacted with steam (212° F.) for 12 minutes (to gelatinize the starch in the grains).

(d) *Lye treatment.*—The cooked wheat, still in the reel was sprayed with hot (about 180° F.) 25% aqueous NaOH, using an amount of the solution equal to 20% the weight of the wheat. The lye-coated wheat was held in the reel 3 minutes while steam was applied to it to keep it hot (about 180° F.). The lye-treated wheat was then rinsed on a rotating screen with cold water to quench it and remove at least part of the NaOH.

(e) *Peeling.*—The lye-treated wheat was slurried with excess water and the slurry was pumped under 40 lbs./sq. in. pressure and at a rate of 25 gal./min. through a hydrocyclone. This device had a diameter (at the top) of 3" and a length of 24". The discharge tip 6 had a diameter of ¼", the inlet and outlet 7 and 8 were standard ½" pipe. Pressure drop through the device was 40 lbs./sq. in. The peeled grain issuing from the discharge tip was washed thoroughly with water, using counterflow through a trough equipped with a screw conveyor.

(f) *Acid treatment.*—The washed, peeled grain was passed through another trough equipped with a screw conveyor wherein it was contacted with 1% aqueous acetic acid at 120° F. for 5 min. In running this step, about 1 lb. of acid per 100 lbs. of grain was metered into the trough to make up for the acid neutralized by the alkali in the grain. The acid-treated grain was then washed with water on a screen.

(g) *Drying.*—The grain, which at this point contained about 50% $H_2O$, was dried. Drying was in a belt-trough dryer wherein a gently-mixing bed of the grain was contacted with a stream of warm air. Other types of driers such as rotary kilns, tunnel driers, etc. can, of course, be used. In any case, the drying is continued until the grain contains 10–14% moisture.

Yield of the product, which has been named WURLD Wheat, was 85 lbs. per 100 lbs. of raw wheat. About 5 lbs. of bran (per 100 lbs. raw wheat) could be recovered from the stream of water and bran rising from the upper outlet of the hydrocyclone by applying screening, pressing, and drying to this effluent. Reagents used were (per 100 lbs. raw wheat): 4 lbs. of NaOH, 1 lb. acetic acid.

EXAMPLE II

The process as described above was repeated except that in this case the steps *a*, *b*, and *c* were omitted (i.e., the wheat was not cooked). The raw wheat prior to lye treatment was merely heated to about 180° F. by contacting it with steam for about 5 min. The lye treatment and subsequent steps were as above.

Analyses of the products are given below:

| Property | Original wheat | Example I WURLD Wheat | Example II Uncooked WURLD Wheat |
|---|---|---|---|
| Color | Brown | Yellow-white | White. |
| Colored bran content | 9% | 0% | 1%. |
| Cooking time | 40 min | 15 min | 25 min. |
| Yield | 100% | 85% | 90%. |
| Density | 64 lb./bu | 40 lb./bu | 61 lb./bu. |
| Protein | 12% | 11% | 11%. |
| Fat | 1.4% | 1.0% | 1.3%. |
| Thiamine | 0.39 mg./100 g. | 0.12 mg./100 g. | 0.23 mg./100 g. |
| Riboflavin | 0.15 mg./100 g. | 0.10 mg./100 g. | 0.09 mg./100 g. |
| Germ | Present | Absent | Variable. |

EXAMPLE III

The process described in Example I was applied to (A) barley (Campagna variety) and (B) to rough rice (Calrose variety). The advantages of the products are particularly demonstrated by the following tables which compare the products of this invention with those prepared from the same original grains by the usual milling techniques. Particularly significant are the higher yields and higher protein contents.

| Property | Example IIIA WURLD Barley | Pearled barley [1] | Example IIIB WURLD Rice | Polished rice [1] |
|---|---|---|---|---|
| Shape | Elongated | Round | Thick elongated | Thin elongated. |
| Color | Yellow | Gray | White | White. |
| Cooking time, min | 35 | 40 | 20 | 25. |
| Yield, percent | 88 | 55 | 95 | 70. |
| Protein, percent | 18 | 10 | 6.5 | 6.0. |

[1] Prepared by milling the respective grains.

Having thus described the invention, we claim:

1. A process for peeling grain which comprises:
   (a) Contacting the grain with hot, aqueous sodium hydroxide until the peel is loosened,
   (b) Pumping a slurry of the treated grain and water into a conical zone wherein the slurry is directed in a spiral path of decreasing radius of curvature and increasing angular velocity sufficiently high to detach the loosened peel from the kernels, and to separate the peeled kernels from the remainder of the slurry, and
   (c) Separately withdrawing from said zone the peeled kernels and the remainder of the slurry.

2. The process of claim 1 wherein the grain is wheat.

3. The process of claim 1 wherein the grain is barley.

4. A continuous process for peeling grain which comprises:
   (a) Continuously contacting the grain with hot, aqueous sodium hydroxide at a concentration and for a time sufficient to loosen the peel on the kernels,
   (b) Continuously pumping a slurry of the treated grain and water into a conical zone wherein the slurry is directed in a spiral path of decreasing radius of curvature and increasing angular velocity sufficiently high to detach the loosened peel from the kernels and to separate the peeled kernels from the remainder of the slurry, said remainder being mainly water and peel fragments,
   (c) Continuously withdrawing the peeled kernels from the base of the said conical zone,
   (d) Continuously separately withdrawing the water and peel fragments from the upper axial portion of said conical zone, and
   (e) Drying the peeled kernels.

References Cited

UNITED STATES PATENTS

| | | | |
|---|---|---|---|
| 288,669 | 11/1883 | Schwarzwaelder | 146—235 |
| 1,483,406 | 2/1924 | Young | 99—80 XR |
| 2,007,693 | 7/1935 | Ruter | 146—221.8 |
| 2,040,816 | 5/1936 | Kaemmerling | 241—275 |
| 2,174,982 | 10/1939 | Kellog | 99—80 |

WILLIAM W. DYER, Jr., *Primary Examiner.*